Dec. 31, 1957 C. C. POWELL 2,818,174
AUTOMATIC EGG SCALE
Filed Sept. 17, 1956 2 Sheets-Sheet 2
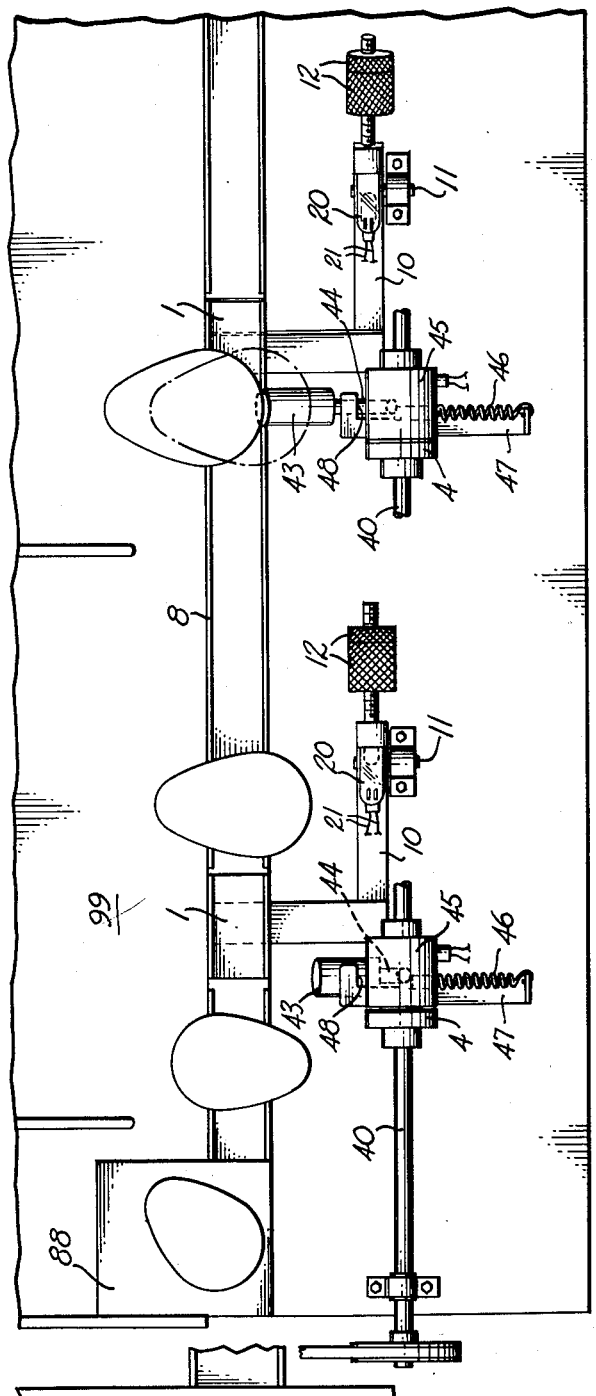
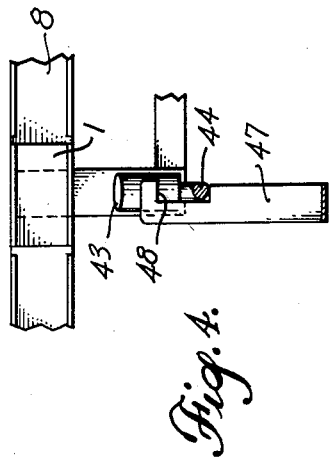
INVENTOR.
CLYDE C. POWELL
BY Reynolds, Beach & Christensen
ATTORNEYS 2,818,174
Patented Dec. 31, 1957

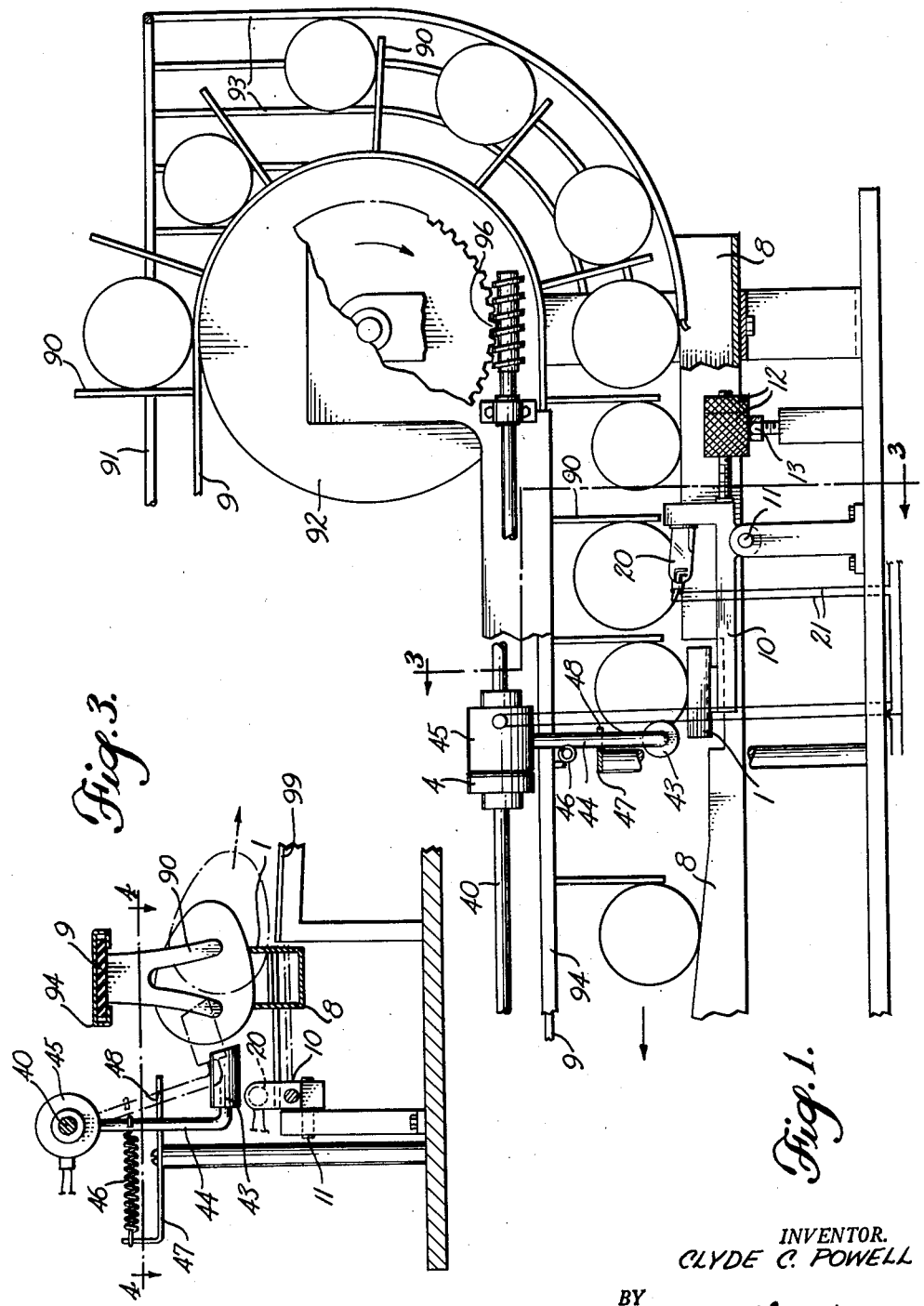

2,818,174
AUTOMATIC EGG SCALE

Clyde C. Powell, Bellevue, Wash., assignor to National Poultry Equipment Company, Renton, Wash., a partnership Application September 17, 1956, Serial No. 610,306

6 Claims. (Cl. 209—121)

The present invention concerns an automatic egg scale, designed for use in conjunction with an egg cleaning machine, and is an improvement upon the scale disclosed and claimed in my companion application Serial No. 524,436, filed July 26, 1955.

In that egg scale, as in the present one, eggs of random sizes travel singly in spaced relationship along a track, and over successive scale platforms which constitute segments of the track. An egg which is lighter than the weight-sensitive means associated with a given platform will not depress that platform, but may depress a later platform which is sensitive to lighter eggs. When a platform is thus depressed, an energizing device causes an egg-engaging member to be actuated and to move in a locus to engage the egg which has just depressed the corresponding platform, and this egg is thereby pushed off the track and into a bin which receives all eggs of like weight.

In the now pending application the egg-engaging means was precision built, and the parts of the scale and weight-sensitive means were sensitive enough to be affected by eggs of but little different weight. Nevertheless, the mechanism being thus sensitive, tended to be somewhat complex and hence expensive, and to require oiling and other care at rather frequent intervals. It has been found that it is not necessary to have weight-sensitive mechanism and egg pusher means of such complexity, and that the device can be greatly simplified in construction and made more reliable in operation, without frequent servicing, and without undue sacrifice of sensitivity, by the revised construction which is the subject of the present invention.

The present invention, then, concerns a simplification of the mechanism shown in the now pending application to the end of making it less expensive and somewhat more rugged and simple in construction and in upkeep.

In the accompanying drawings, the invention is shown in a form which is presently preferred by me; it being understood however that various changes may be made in the form, character, and arrangement of the elements without departing from the invention as set forth in the appended claims.

Figure 1 is a side elevational view of the track and of a single egg-weighing station.

Figure 2 is a plan view of the track and two such stations, illustrating one station in operation and another inactive.

Figure 3 is, in general, a transverse sectional view along the line shown at 3—3 in Figure 1.

Figure 4 is a detail sectional view substantially at the line 4—4 of Figure 3, but omitting the egg conveyor mechanism.

Since the present scale is designed to function at the discharge end of an egg-cleaning machine, the eggs are advanced by a belt 9 and its spaced fingers 90, by which they were advanced through the egg-cleaning machine. They are confined at their ends by side bars 91. The fingers 90 maintain the eggs separate and in spaced relation as they advance. Up to this point, the eggs are not graded as to size, and various sizes from the largest to the smallest travel in random succession along the track. Reaching a pulley 92, the eggs travel about the pulley, being confined by a cage 93, until they arrive at a track 8, which may be of channel shape in cross section, along which they are advanced by rolling, as before, by the fingers 90. The drive for the pulley 92 is by means of worm and gear drive indicated at 96. The belt 9 in its lower run is confined at its edges within a guide 94.

There are several egg-weighing stations in succession along the track 8, one for each grade size. At each such station is a scale platform 1 which, in effect, is a segment of the track 8. This is supported upon a scale beam 10 pivoted at 11, and counterweighted at 12. Each counterweight is adjustable lengthwise of the scale beam 10, whereby each scale may be delicately adjusted for the very slight differences in weight between individual eggs of different grades. An adjustable stop 13 maintains the scale platform 1 in proper position with relation to the track.

Alongside the track, and preferably elevated somewhat above the level thereof, is a continously rotative shaft 40. The shaft has secured upon it, at each weighing station, a driving clutch element 4, and also mounted upon the shaft and coaxial therewith is a driven clutch element 45 which, however, is sufficiently loosely supported upon the shaft 40 that it will not tend to rotate with the shaft despite the latter's continuing rotation. The complemental clutch elements 4 and 45 are normally slightly out of engagement one with another, and may be so held by internal spring means (not shown). Associated with one or the other of the complemental clutch elements, for instance, with the driven clutch element 45, is an electromagnet, which normally is deenergized, and the driving clutch element 4 in such case is of magnetic material, so that when the electromagnet at 45 is energized, the complemental clutch elements 4 and 45 will be drawn into engagement. Thereupon the driven clutch element 45 will rotate with the shaft 40 and the driving clutch element 4.

Directly connected with the driven clutch element 45 is a radiating arm 44 which preferably hangs down and by its weight tends to maintain the clutch element 45 against rotation, but which when the two clutch elements are interengaged, causes a pusher 43 at its free end to swing in a locus which includes the path of the egg which has just depressed the corresponding egg platform 1. Assisting in holding the arm 44 in its retracted position is a spring 46, and a plate 47 is notched to receive the arm 44 and to provide a shoulder 48 which the arm 44 engages at the limit of its egg-engaging movement, as shown in dot-dash lines in Figure 3, to prevent further movement of the arm. Of course, upon deenergization of the electromagnet at 45, the arm 44 will drop back to the full line position of Figure 3, under the influence of its own weight and the spring 46, either or both.

The scale beam 10 carries a switch, for instance, a mercury switch, indicated at 20, so positioned that when the scale platform 1 is in its normal upraised position, the switch 20 will be open, but when the scale platform is depressed, the switch at 20 will be closed. The switch at 20 and the electromagnet at 45 are connected by conventional circuit means, indicated at 21, whereby to energize the electromagnet upon closure of the mercury switch.

As the eggs travel along the track 8, singly and spaced therealong, each will pass over the successive platforms 1 until each egg reaches a platform which, with its weight-sensitive means, will be depressed by an egg of that weight. When the scale platform is thus depressed, its mercury switch 20 being energized, energizes the corresponding electromagnet at 45, and the complemental clutch elements 4 and 45 are interengaged, causing the arm 44 to swing and the egg pusher 43 to engage that egg which has just depressed the scale platform, and that egg, as indicated at the right in Figure 2, or in dot-dash lines in Figure 3, is pushed laterally off the track or off the scale platform. Immediately the scale platform rises the switch 20 and the electromagnet 45 are deenergized, and the arm 44 drops back to its initial position. The egg upon being pushed off the track is received upon a gently inclined table or apron 99 down which it rolls, to collect with other eggs of like weight in a segregated bin. Should an egg be so light that it will not depress any of the platforms in its passage along the track, it is a lightweight or peewee egg, and comes at last to a deflecting platform 88 at the end of the track 8, and rolls off the track into the corresponding bin.

In the present invention, in contrast to the invention disclosed in the now pending application, it will be seen that the egg-engaging means is of extremely simple construction and is actuated directly by the driven clutch element, upon energization of the latter and its interengagement with the complemental continuously rotative driving clutch element.

But two egg-weighing stations are illustrated, although it will be understood that these are representative of any number that may be employed, and usually a larger number would be provided.

I claim as my invention:

1. In combination with a track whereon eggs rest and along which they travel singly in spaced relationship, a plurality of scale platforms constituting segments of said track and located at individual stations spaced therealong, weight-sensitive means to maintain each platform elevated until an egg which exceeds a particular weight, individual to each platform and its associated weight-sensitive means, depresses the same, a continuously driving clutch element at each station, and a complemental driven clutch element positioned for driving engagement with said driving element, but normally disengaged therefrom and disposed in an inactive position, an egg-engaging member supported directly upon said driven clutch element for movement by the latter from a retracted position in a locus to engage and displace from the track an egg which has depressed the corresponding scale platform, actuator means for interengaging the complemental clutch elements when it is itself energized, and an energizing means connected for movement with the weight-sensitive means, upon depression of the latter's platform, from a normal deenergized position to an energizing position, said energizing means being operatively connected to said actuator means to energize the latter.

2. The combination of claim 1, including a continuously rotative shaft whereon the several driving clutch elements at the individual stations are secured, the several driven clutch elements being supported upon but loose upon said shaft.

3. In combination with a track whereon eggs rest and along which they travel singly in spaced relationship, a plurality of vertically movable scale platforms located at individual stations along the track, and constituting segments of said track, weight-sensitive means to maintain each platform elevated until an egg which exceeds a particular weight, individual to each such platform and its associated weight-sensitive means, depresses the same, a continuously driving clutch element at each station, and a complemental driven clutch element positioned for driving engagement with said driving element, but normally disengaged therefrom and disposed in an inactive position, a pusher at each station guided for movement transversely of the track, and yieldingly held in retracted position, but operatively mounted upon the driven clutch member for movement with the latter to engage and push from the track the passing egg which depressed the corresponding platform, an actuator for moving the complemental clutch elements into driving engagement, and an energizing means connected for movement with the weight-sensitive means from a normal deenergized position to an energized position, said energizing means being operatively connected to said actuator to energize the latter upon movement of the energizing means, with its weight-sensitive means, into energizing position.

4. The combination of claim 3, including a continuously rotative shaft whereon the driving clutch elements at the several stations are secured, the several driven clutch elements being supported loosely upon said shaft, each adjacent its driving clutch element but spaced slightly axially therefrom, and wherein the actuator at each station includes an electromagnet supported by one such clutch element and a magnetic armature supported by the other such clutch element, and the energizing means includes a normally open switch movable with depression of the corresponding platform to circuit-closed position, and operatively connected to said electromagnet to energize the latter.

5. The combination of claim 3, wherein the clutch elements are rotative and coaxial, and the pusher comprises an arm radiating from the driven clutch member in a locus which includes the position of an egg which has depressed the corresponding scale platform.

6. The combination of claim 5, including a stop element disposed transversely to the locus of the pusher arm to halt the swing thereof after it has engaged and pushed off the egg which has depressed the scale platform.

References Cited in the file of this patent

UNITED STATES PATENTS

| | | |
|---|---|---|
| 603,413 | Stearns | May 3, 1898 |
| 1,999,827 | Wardley | Apr. 30, 1935 |
| 2,065,888 | Du Brul et al. | Dec. 29, 1936 |
| 2,112,259 | Wyland | Mar. 29, 1938 |
| 2,116,895 | Howard | May 10, 1938 |
| 2,197,381 | Mansbendel | Apr. 16, 1940 |
| 2,307,695 | Mansbendel | Jan. 5, 1943 |
| 2,371,077 | Strauss | Mar. 6, 1945 |
| 2,579,602 | Niederer et al. | Dec. 25, 1951 |
| 2,645,344 | Hayter | July 14, 1953 |